(12) United States Patent
Quigley et al.

(10) Patent No.: US 8,746,289 B2
(45) Date of Patent: Jun. 10, 2014

(54) WEIGHTED SPOOLABLE PIPE

(75) Inventors: Peter A. Quigley, Duxbury, MA (US); Michael Feechan, Katy, TX (US)

(73) Assignee: Fiberspar Corporation, New Bedford, MA (US)

( * ) Notice: Subject to any disclaimer, the term of this patent is extended or adjusted under 35 U.S.C. 154(b) by 940 days.

(21) Appl. No.: 12/029,812

(22) Filed: Feb. 12, 2008

(65) Prior Publication Data
US 2008/0210329 A1 Sep. 4, 2008

Related U.S. Application Data

(60) Provisional application No. 60/890,080, filed on Feb. 15, 2007.

(51) Int. Cl.
*F16L 11/00* (2006.01)
*F16L 9/14* (2006.01)
(52) U.S. Cl.
USPC ........... 138/137; 138/123; 138/124; 138/129; 138/144
(58) Field of Classification Search
USPC ......... 138/104, 123, 124, 127, 129, 137, 141, 138/144, 150, 153
See application file for complete search history.

(56) References Cited

U.S. PATENT DOCUMENTS

| | | |
|---|---|---|
| 87,993 A | 3/1869 | Weston |
| 142,388 A | 9/1873 | Goble |
| 396,176 A | 1/1889 | Simpson |
| 418,906 A | 1/1890 | Bosworth |
| 482,181 A | 9/1892 | Kellom |
| 646,887 A | 4/1900 | Stowe et al. |
| 749,633 A | 1/1904 | Seeley |
| 1,234,812 A | 7/1917 | Simmmons |
| 1,793,455 A | 2/1931 | Buchanan |
| 1,890,290 A | 12/1932 | Hargreaves |
| 1,930,285 A | 10/1933 | Robinson |
| 2,464,416 A | 3/1949 | Raybould |
| 2,467,520 A | 4/1949 | Brubaker |
| 2,481,001 A | 9/1949 | Burckle |
| 2,624,366 A | 1/1953 | Pugh |
| 2,648,720 A | 8/1953 | Alexander |
| 2,690,769 A | 10/1954 | Brown |
| 2,725,713 A | 12/1955 | Blanchard |
| 2,742,931 A | 4/1956 | De Ganahl |
| 2,750,569 A | 6/1956 | Moon |

(Continued)

FOREIGN PATENT DOCUMENTS

| | | |
|---|---|---|
| BE | 559688 | 8/1957 |
| CH | 461199 | 8/1968 |

(Continued)

OTHER PUBLICATIONS

Williams, J.G., "Oil Industry Experiences with Fiberglass Components," Offshore Technology Conference, 1987, pp. 211-220.

(Continued)

*Primary Examiner* — Ryan Reis
(74) *Attorney, Agent, or Firm* — Goodwin Procter LLP

(57) ABSTRACT

A spoolable pipe is disclosed, the spoolable pipe having an internal pressure barrier formed about a longitudinal axis, a reinforcing layer(s) enclosing the internal pressure barrier, and a weight layer comprising fibers. The pipe can also include an energy conductor(s) integrated with and/or located between the internal pressure barrier and/or the reinforcing layer(s).

23 Claims, 3 Drawing Sheets

(56) References Cited

U.S. PATENT DOCUMENTS

| | | | |
|---|---|---|---|
| 2,810,424 A | 10/1957 | Swartswelter at al. |
| 2,969,812 A | 1/1961 | De Ganahl |
| 2,973,975 A | 3/1961 | Ramberg et al. |
| 2,991,093 A | 7/1961 | Guarnaschelli |
| 3,086,369 A | 4/1963 | Brown |
| 3,116,760 A | 1/1964 | Matthews |
| 3,170,137 A | 2/1965 | Brandt |
| 3,212,528 A | 10/1965 | Haas |
| 3,277,231 A | 10/1966 | Downey at al. |
| 3,306,637 A | 2/1967 | Press at al. |
| 3,334,663 A | 8/1967 | Peterson |
| 3,354,292 A | 11/1967 | Kahn |
| 3,379,220 A | 4/1968 | Kiuchi at al. |
| 3,383,223 A | 5/1968 | Rose |
| 3,390,704 A | 7/1968 | Woodell |
| 3,477,474 A | 11/1969 | Mesler |
| 3,507,412 A | 4/1970 | Carter |
| 3,522,413 A | 8/1970 | Chrow |
| 3,554,284 A | 1/1971 | Nystrom |
| 3,579,402 A | 5/1971 | Goldsworthy at al. |
| 3,589,135 A | 6/1971 | Ede |
| 3,589,752 A | 6/1971 | Spencer et al. |
| 3,604,461 A | 9/1971 | Matthews |
| 3,606,396 A | 9/1971 | Prosdocimo at al. |
| 3,606,402 A | 9/1971 | Medney |
| 3,654,967 A | 4/1972 | Atwell et al. |
| 3,677,978 A | 7/1972 | Dowbenko at al. |
| 3,685,860 A | 8/1972 | Schmidt |
| 3,692,601 A | 9/1972 | Goldsworthy at al. |
| 3,696,332 A | 10/1972 | Dickson, Jr. et al. |
| 3,700,519 A | 10/1972 | Carter |
| 3,701,489 A | 10/1972 | Goldsworthy at al. |
| 3,728,187 A | 4/1973 | Martin |
| 3,730,229 A | 5/1973 | D'Onofrio |
| 3,734,421 A | 5/1973 | Karlson et al. |
| 3,738,637 A | 6/1973 | Goldsworthy et al. |
| 3,740,285 A | 6/1973 | Goldsworthy at al. |
| 3,744,016 A | 7/1973 | Davis |
| 3,769,127 A | 10/1973 | Goldsworthy et al. |
| 3,773,090 A | 11/1973 | Ghersa et al. |
| 3,776,805 A | 12/1973 | Hansen |
| 3,783,060 A | 1/1974 | Goldsworthy at al. |
| 3,790,438 A | 2/1974 | Lewis et al. |
| 3,814,138 A | 6/1974 | Courtot |
| 3,817,288 A | 6/1974 | Ball |
| 3,828,112 A | 8/1974 | Johansen et al. |
| 3,856,052 A | 12/1974 | Feucht |
| 3,858,616 A | 1/1975 | Thiery et al. |
| 3,860,040 A | 1/1975 | Sullivan |
| 3,860,742 A | 1/1975 | Medney |
| 3,866,633 A | 2/1975 | Taylor |
| 3,901,281 A | 8/1975 | Morrisey |
| 3,907,335 A | 9/1975 | Burge et al. |
| 3,913,624 A | 10/1975 | Ball |
| 3,932,559 A | 1/1976 | Cantor et al. |
| 3,933,180 A | 1/1976 | Carter |
| 3,956,051 A | 5/1976 | Carter |
| 3,957,410 A | 5/1976 | Goldsworthy et al. |
| 3,960,629 A | 6/1976 | Goldsworthy |
| 3,974,862 A | 8/1976 | Fuhrmann et al. |
| 3,980,325 A | 9/1976 | Robertson |
| RE29,112 E | 1/1977 | Carter |
| 4,001,442 A | 1/1977 | Stahlberger et al. |
| 4,007,070 A | 2/1977 | Busdiecker |
| 4,013,101 A | 3/1977 | Logan et al. |
| 4,032,177 A | 6/1977 | Anderson |
| 4,048,807 A | 9/1977 | Ellers et al. |
| 4,053,343 A | 10/1977 | Carter |
| 4,057,610 A | 11/1977 | Goettler et al. |
| 4,067,916 A | 1/1978 | Jaeger et al. |
| 4,095,865 A | 6/1978 | Denison et al. |
| 4,108,701 A | 8/1978 | Stanley |
| 4,111,469 A | 9/1978 | Kavick |
| 4,114,393 A | 9/1978 | Engle, Jr. et al. |
| 4,119,122 A | 10/1978 | de Putter |
| 4,125,423 A | 11/1978 | Goldsworthy |
| 4,133,972 A * | 1/1979 | Andersson et al. ............. 174/47 |
| 4,137,949 A * | 2/1979 | Linko et al. ................... 138/125 |
| 4,139,025 A | 2/1979 | Carlstrom et al. |
| 4,148,963 A | 4/1979 | Bourrain et al. |
| 4,190,088 A | 2/1980 | Lalikos et al. |
| 4,200,126 A | 4/1980 | Fish |
| 4,220,381 A | 9/1980 | van der Graaf et al. |
| 4,226,446 A | 10/1980 | Burrington |
| 4,241,763 A | 12/1980 | Antal et al. |
| 4,248,062 A | 2/1981 | McLain et al. |
| 4,261,390 A | 4/1981 | Belofsky |
| 4,273,160 A | 6/1981 | Lowles |
| 4,303,263 A | 12/1981 | Legris |
| 4,303,457 A | 12/1981 | Johansen et al. |
| 4,306,591 A | 12/1981 | Arterburn |
| 4,307,756 A | 12/1981 | Voigt et al. |
| 4,308,999 A | 1/1982 | Carter |
| 4,336,415 A | 6/1982 | Walling |
| 4,351,364 A | 9/1982 | Cocks et al. |
| 4,380,252 A | 4/1983 | Gray et al. |
| 4,385,644 A | 5/1983 | Kaempen |
| 4,402,346 A | 9/1983 | Cheetham et al. |
| 4,421,806 A | 12/1983 | Marks et al. |
| 4,422,801 A | 12/1983 | Hale et al. |
| 4,434,816 A | 3/1984 | Di Giovanni et al. |
| 4,445,734 A | 5/1984 | Cunningham |
| 4,446,892 A | 5/1984 | Maxwell et al. |
| 4,447,378 A | 5/1984 | Gray et al. |
| 4,463,779 A | 8/1984 | Wink et al. |
| 4,469,729 A | 9/1984 | Watanabe et al. |
| 4,488,577 A | 12/1984 | Shilad et al. |
| 4,507,019 A | 3/1985 | Thompson |
| 4,515,737 A | 5/1985 | Karino et al. |
| 4,522,058 A | 6/1985 | Ewing |
| 4,522,235 A | 6/1985 | Kluss et al. |
| 4,530,379 A | 7/1985 | Policelli |
| 4,556,340 A | 12/1985 | Morton |
| 4,567,916 A | 2/1986 | Antal et al. |
| 4,578,675 A | 3/1986 | MacLeod |
| 4,606,378 A | 8/1986 | Meyer et al. |
| 4,627,472 A | 12/1986 | Goettler et al. |
| 4,652,475 A | 3/1987 | Haney et al. |
| 4,657,795 A | 4/1987 | Foret et al. |
| 4,681,169 A | 7/1987 | Brookbank, III |
| 4,700,751 A | 10/1987 | Fedrick |
| 4,712,813 A | 12/1987 | Passerell et al. |
| 4,728,224 A | 3/1988 | Salama et al. |
| 4,741,795 A | 5/1988 | Grace et al. |
| 4,758,455 A | 7/1988 | Campbell et al. |
| 4,789,007 A | 12/1988 | Cretel et al. |
| 4,842,024 A | 6/1989 | Palinchak |
| 4,844,516 A | 7/1989 | Baker |
| 4,849,668 A | 7/1989 | Crawley et al. |
| 4,854,349 A | 8/1989 | Foreman |
| 4,859,024 A | 8/1989 | Rahman |
| 4,869,293 A | 9/1989 | Botsolas |
| 4,903,735 A | 2/1990 | Delacour et al. |
| 4,913,657 A | 4/1990 | Naito et al. |
| 4,936,618 A | 6/1990 | Sampa et al. |
| 4,941,774 A | 7/1990 | Harmstorf et al. |
| 4,942,903 A | 7/1990 | Jacobsen et al. |
| 4,972,880 A | 11/1990 | Strand |
| 4,992,787 A | 2/1991 | Helm |
| 4,995,761 A | 2/1991 | Barton |
| 5,024,252 A | 6/1991 | Ochsner |
| 5,048,572 A | 9/1991 | Levine |
| 5,077,107 A | 12/1991 | Kaneda et al. |
| 5,090,741 A | 2/1992 | Yokomatsu et al. |
| 5,097,870 A | 3/1992 | Williams |
| 5,156,206 A | 10/1992 | Cox |
| 5,170,011 A | 12/1992 | Martucci |
| 5,172,765 A | 12/1992 | Sas-Jaworsky et al. |
| 5,176,180 A | 1/1993 | Williams et al. |
| 5,182,779 A | 1/1993 | D'Agostino et al. |
| 5,184,682 A | 2/1993 | Delacour et al. |
| 5,188,872 A | 2/1993 | Quigley |
| 5,209,136 A | 5/1993 | Williams |
| 5,222,769 A | 6/1993 | Kaempen |

(56) References Cited

U.S. PATENT DOCUMENTS

| | | |
|---|---|---|
| 5,261,462 A | 11/1993 | Wolfe et al. |
| 5,265,648 A | 11/1993 | Lyon |
| 5,285,008 A | 2/1994 | Sas-Jaworsky et al. |
| 5,285,204 A | 2/1994 | Sas-Jaworsky |
| 5,330,807 A * | 7/1994 | Williams ............... 428/34.5 |
| 5,332,269 A | 7/1994 | Homm |
| 5,334,801 A | 8/1994 | Mohn et al. |
| 5,346,658 A | 9/1994 | Gargiulo |
| 5,348,088 A | 9/1994 | Laflin et al. |
| 5,348,096 A | 9/1994 | Williams |
| 5,351,752 A | 10/1994 | Wood et al. |
| RE34,780 E | 11/1994 | Trenconsky et al. |
| 5,364,130 A | 11/1994 | Thalmann |
| 5,373,870 A | 12/1994 | Derroire et al. |
| 5,394,488 A | 2/1995 | Fernald et al. |
| 5,395,913 A | 3/1995 | Bottcher et al. |
| 5,398,729 A | 3/1995 | Spurgat |
| 5,416,724 A | 5/1995 | Savic |
| 5,426,297 A | 6/1995 | Dunphy et al. |
| 5,428,706 A | 6/1995 | Lequeux et al. |
| 5,435,867 A | 7/1995 | Wolfe et al. |
| 5,437,311 A | 8/1995 | Reynolds |
| 5,437,899 A | 8/1995 | Quigley |
| 5,443,099 A | 8/1995 | Chaussepied et al. |
| 5,452,923 A | 9/1995 | Smith |
| 5,460,416 A | 10/1995 | Freidrich et al. |
| RE35,081 E | 11/1995 | Quigley |
| 5,469,916 A | 11/1995 | Sas-Jaworsky et al. |
| 5,472,764 A | 12/1995 | Kehr et al. |
| 5,494,374 A | 2/1996 | Youngs et al. |
| 5,499,661 A | 3/1996 | Odru et al. |
| 5,524,937 A | 6/1996 | Sides, III et al. |
| 5,525,698 A | 6/1996 | Bottcher et al. |
| 5,538,513 A | 7/1996 | Okajima et al. |
| 5,551,484 A * | 9/1996 | Charboneau ............... 138/104 |
| 5,558,375 A | 9/1996 | Newman |
| 5,622,211 A | 4/1997 | Martin et al. |
| 5,641,956 A | 6/1997 | Vengsarkar et al. |
| 5,671,811 A | 9/1997 | Head et al. |
| 5,683,204 A | 11/1997 | Lawther et al. |
| 5,692,545 A | 12/1997 | Rodrigue |
| 5,718,956 A | 2/1998 | Gladfelter et al. |
| 5,730,188 A | 3/1998 | Kalman et al. |
| 5,755,266 A | 5/1998 | Aanonsen et al. |
| 5,758,990 A | 6/1998 | Davies et al. |
| 5,785,091 A | 7/1998 | Barker, II |
| 5,795,102 A | 8/1998 | Corbishley |
| 5,797,702 A | 8/1998 | Drost et al. |
| 5,798,155 A | 8/1998 | Yanagawa et al. |
| 5,804,268 A | 9/1998 | Mukawa et al. |
| 5,826,623 A | 10/1998 | Akiyoshi et al. |
| 5,828,003 A | 10/1998 | Thomeer et al. |
| 5,865,216 A | 2/1999 | Youngs |
| 5,875,792 A | 3/1999 | Campbell, Jr. et al. |
| 5,908,049 A | 6/1999 | Williams et al. |
| 5,913,337 A | 6/1999 | Williams et al. |
| 5,913,357 A | 6/1999 | Hanazaki et al. |
| 5,921,285 A | 7/1999 | Quigley et al. |
| 5,933,945 A | 8/1999 | Thomeer et al. |
| 5,950,651 A | 9/1999 | Kenworthy et al. |
| 5,951,812 A | 9/1999 | Gilchrist, Jr. |
| 5,979,506 A | 11/1999 | Aarseth |
| 5,984,581 A | 11/1999 | McGill et al. |
| 5,988,702 A | 11/1999 | Sas-Jaworsky |
| 6,004,639 A | 12/1999 | Quigley et al. |
| 6,016,845 A | 1/2000 | Quigley et al. |
| 6,032,699 A | 3/2000 | Cochran et al. |
| 6,065,540 A | 5/2000 | Thomeer et al. |
| 6,066,377 A * | 5/2000 | Tonyali et al. ............... 428/36.3 |
| 6,076,561 A | 6/2000 | Akedo et al. |
| 6,093,752 A | 7/2000 | Park et al. |
| 6,109,306 A | 8/2000 | Kleinert |
| 6,136,216 A | 10/2000 | Fidler et al. |
| 6,148,866 A | 11/2000 | Quigley et al. |
| 6,209,587 B1 | 4/2001 | Hsich et al. |
| 6,220,079 B1 | 4/2001 | Taylor et al. |
| 6,286,558 B1 | 9/2001 | Quigley et al. |
| 6,315,002 B1 | 11/2001 | Antal et al. |
| 6,328,075 B1 | 12/2001 | Furuta et al. |
| 6,334,466 B1 | 1/2002 | Jani et al. |
| 6,357,485 B2 | 3/2002 | Quigley et al. |
| 6,357,966 B1 | 3/2002 | Thompson et al. |
| 6,361,299 B1 | 3/2002 | Quigley et al. |
| 6,372,861 B1 | 4/2002 | Schillgalies et al. |
| 6,390,140 B2 * | 5/2002 | Niki et al. ............... 138/127 |
| 6,402,430 B1 | 6/2002 | Guesnon et al. |
| 6,422,269 B1 * | 7/2002 | Johansson et al. ............... 138/137 |
| 6,461,079 B1 | 10/2002 | Beaujean et al. |
| 6,470,915 B1 | 10/2002 | Enders et al. |
| 6,532,994 B1 | 3/2003 | Enders et al. |
| 6,557,485 B1 | 5/2003 | Sauter et al. |
| 6,604,550 B2 | 8/2003 | Quigley et al. |
| 6,620,475 B1 | 9/2003 | Reynolds, Jr. et al. |
| 6,631,743 B2 | 10/2003 | Enders et al. |
| 6,634,387 B1 | 10/2003 | Glejbøl et al. |
| 6,634,388 B1 | 10/2003 | Taylor et al. |
| 6,634,675 B2 | 10/2003 | Parkes |
| 6,663,453 B2 | 12/2003 | Quigley et al. |
| 6,706,348 B2 | 3/2004 | Quigley et al. |
| 6,706,398 B1 | 3/2004 | Revis |
| 6,746,737 B2 | 6/2004 | Debalme et al. |
| 6,764,365 B2 | 7/2004 | Quigley et al. |
| 6,773,774 B1 | 8/2004 | Crook et al. |
| 6,787,207 B2 | 9/2004 | Lindstrom et al. |
| 6,803,082 B2 | 10/2004 | Nichols et al. |
| 6,807,988 B2 | 10/2004 | Powell et al. |
| 6,807,989 B2 | 10/2004 | Enders et al. |
| 6,857,452 B2 * | 2/2005 | Quigley et al. ............... 138/125 |
| 6,889,716 B2 | 5/2005 | Lundberg et al. |
| 6,902,205 B2 | 6/2005 | Bouey et al. |
| 6,978,804 B2 | 12/2005 | Quigley et al. |
| 6,983,766 B2 | 1/2006 | Baron et al. |
| 7,021,339 B2 | 4/2006 | Hagiwara et al. |
| 7,029,356 B2 | 4/2006 | Quigley et al. |
| 7,080,667 B2 | 7/2006 | McIntyre et al. |
| 7,152,632 B2 | 12/2006 | Quigley et al. |
| 7,234,410 B2 | 6/2007 | Quigley et al. |
| 7,243,716 B2 | 7/2007 | Denniel et al. |
| 7,285,333 B2 | 10/2007 | Wideman et al. |
| 7,328,725 B2 | 2/2008 | Henry et al. |
| 7,498,509 B2 | 3/2009 | Brotzell et al. |
| 7,523,765 B2 | 4/2009 | Quigley et al. |
| 7,600,537 B2 | 10/2009 | Bhatnagar et al. |
| 8,066,033 B2 | 11/2011 | Quigley et al. |
| 8,187,687 B2 | 5/2012 | Wideman et al. |
| 2001/0006712 A1 | 7/2001 | Hibino et al. |
| 2001/0013669 A1 | 8/2001 | Cundiff et al. |
| 2001/0025664 A1 | 10/2001 | Quigley et al. |
| 2002/0040910 A1 | 4/2002 | Pahl |
| 2002/0081083 A1 | 6/2002 | Griffioen et al. |
| 2002/0094400 A1 | 7/2002 | Lindstrom et al. |
| 2002/0119271 A1 | 8/2002 | Quigley et al. |
| 2002/0185188 A1 | 12/2002 | Quigley et al. |
| 2003/0008577 A1 | 1/2003 | Quigley et al. |
| 2003/0087052 A1 | 5/2003 | Wideman et al. |
| 2004/0014440 A1 | 1/2004 | Makela et al. |
| 2004/0025951 A1 | 2/2004 | Baron et al. |
| 2004/0052997 A1 | 3/2004 | Santo |
| 2004/0074551 A1 | 4/2004 | McIntyre |
| 2004/0096614 A1 | 5/2004 | Quigley et al. |
| 2004/0265524 A1 | 12/2004 | Wideman et al. |
| 2005/0087336 A1 | 4/2005 | Surjaatmadja et al. |
| 2005/0189029 A1 | 9/2005 | Quigley et al. |
| 2007/0125439 A1 | 6/2007 | Quigley et al. |
| 2007/0154269 A1 | 7/2007 | Quigley et al. |
| 2007/0246459 A1 | 10/2007 | Loveless et al. |
| 2008/0006337 A1 | 1/2008 | Quigley et al. |
| 2008/0006338 A1 | 1/2008 | Wideman et al. |
| 2008/0014812 A1 | 1/2008 | Quigley et al. |
| 2008/0185042 A1 | 8/2008 | Feechan et al. |
| 2008/0210329 A1 | 9/2008 | Quigley et al. |
| 2009/0090460 A1 | 4/2009 | Wideman et al. |
| 2009/0107558 A1 | 4/2009 | Quigley et al. |

(56) References Cited

U.S. PATENT DOCUMENTS

| | | |
|---|---|---|
| 2009/0173406 A1 | 7/2009 | Quigley et al. |
| 2009/0278348 A1 | 11/2009 | Brotzell et al. |
| 2010/0101676 A1 | 4/2010 | Quigley et al. |

FOREIGN PATENT DOCUMENTS

| | | |
|---|---|---|
| DE | 1959738 | 6/1971 |
| DE | 3603597 | 8/1987 |
| DE | 4040400 A1 | 8/1992 |
| DE | 4214383 C1 | 9/1993 |
| DE | 19905448 | 8/2000 |
| EP | 0024512 | 3/1981 |
| EP | 0203887 A2 | 12/1986 |
| EP | 352148 | 1/1990 |
| EP | 0352148 A1 | 1/1990 |
| EP | 0427306 A2 | 5/1991 |
| EP | 0024512 | 3/1992 |
| EP | 0503737 A1 | 9/1992 |
| EP | 0505815 | 9/1992 |
| EP | 505815 A2 | 9/1992 |
| EP | 505815 A3 | 9/1992 |
| EP | 0536844 A1 | 4/1993 |
| EP | 0681085 A2 | 11/1995 |
| EP | 0854029 A2 | 7/1998 |
| EP | 0854029 A3 | 7/1998 |
| EP | 0953724 A2 | 11/1999 |
| EP | 0970980 | 1/2000 |
| EP | 0981992 A1 | 3/2000 |
| FR | 989204 | 9/1951 |
| GB | 225599 A | 12/1924 |
| GB | 219300 A | 1/1925 |
| GB | 227009 A | 1/1925 |
| GB | 553110 | 5/1943 |
| GB | 809097 | 2/1959 |
| GB | 909187 | 10/1962 |
| GB | 956500 | 4/1964 |
| GB | 1297250 | 11/1972 |
| GB | 2103744 A | 2/1983 |
| GB | 2159901 | 5/1984 |
| GB | 2 193 006 | 1/1988 |
| GB | 2255994 A | 11/1992 |
| GB | 2270099 A | 3/1994 |
| GB | 2365096 | 2/2002 |
| JP | 02-163592 | 6/1990 |
| WO | WO-8704768 A1 | 8/1987 |
| WO | WO-9113925 A1 | 9/1991 |
| WO | WO-9221908 A1 | 12/1992 |
| WO | WO-9307073 A1 | 4/1993 |
| WO | WO-9319927 | 10/1993 |
| WO | WO-9502782 A1 | 1/1995 |
| WO | WO-9712115 A2 | 4/1997 |
| WO | WO-9919653 A1 | 4/1999 |
| WO | WO-0031458 | 6/2000 |
| WO | WO-0031458 A1 | 6/2000 |
| WO | WO-0073695 | 12/2000 |
| WO | WO-2006003208 | 1/2006 |

OTHER PUBLICATIONS

Austigard E. and R. Tomter; "Composites Subsea: Cost Effective Products; an Industry Challenge", Subsea 94 International Conference, the 1994 Report on Subsea Engineering: The Continuing Challenges.

Connell Mike et al.; "Coiled Tubing: Application for Today's Challenges", Petroleum Engineer International, pp. 18-21 (Jul. 1999).

Feechan Mike et al.; "Spoolable Composites Show Promise", The American Oil & Gas Reporter, pp. 44-50 (Sep. 1999).

Fowler Hampton; "Advanced Composite Tubing Usable", The American Oil & Gas Reporter, pp. 76-81 (Sep. 1997).

Fowler Hampton et al.; "Development Update and Applications of an Advanced Composite Spoolable Tubing", Offshore Technology Conference held in Houston Texas from May 4-7, 1998, pp. 157-162.

Hahn H. Thomas and Williams G. Jerry; "Compression Failure Mechanisms in Unidirectional Composites". NASA Technical Memorandum pp. 1-42 (Aug. 1984).

Hansen et al.; "Qualification and Verification of Spoolable High Pressure Composite Service Lines for the Asgard Field Development Project", paper presented at the 1997 Offshore Technology Conference held in Houston Texas from May 5-8, 1997, pp. 45-54.

Haug et al.; "Dynamic Umbilical with Composite Tube (DUCT)", Paper presented at the 1998 Offshore Technology Conference held in Houston Texas from 4th to 7th, 1998; pp. 699-712.

Lundberg et al.; "Spin-off Technologies from Development of Continuous Composite Tubing Manufacturing Process", Paper presented at the 1998 Offshore Technology Conference held in Houston, Texas from May 4-7, 1998 pp. 149-155.

Marker et al.; "Anaconda: Joint Development Project Leads to Digitally Controlled Composite Coiled Tubing Drilling System", Paper presented at the SPEI/COTA, Coiled Tubing Roundtable held in Houston, Texas from Apr. 5-6, 2000, pp. 1-9.

Measures R. M.; "Smart Structures with Nerves of Glass". Prog. Aerospace Sci. 26(4): 289-351 (1989).

Measures et al.; "Fiber Optic Sensors for Smart Structures", Optics and Lasers Engineering 16: 127-152 (1992).

Poper Peter; "Braiding", International Encyclopedia of Composites, Published by VGH, Publishers, Inc., 220 East 23rd Street, Suite 909, New York, NY I0010.

Quigley et al.; "Development and Application of a Novel Coiled Tubing String for Concentric Workover Services", Paper presented at the 1997 Offshore Technology Conference held in Houston, Texas from May 5-8, 1997, pp. 189-202.

Sas-Jaworsky II and Bell Steve "Innovative Applications Stimulate Coiled Tubing Development", World Oil, 217(6): 61 (Jun. 1996).

Sas-Jaworsky II and Mark Elliot Teel; "Coiled Tubing 1995 Update: Production Applications", World Oil, 216 (6): 97 (Jun. 1995).

Sas-Jaworsky, A. and J.G. Williams, "Advanced composites enhance coiled tubing capabilities", World Oil, pp. 57-69 (Apr. 1994).

Sas-Jaworsky, A. and J.G. Williams, "Development of a composite coiled tubing for oilfield services", Society of Petroleum Engineers, SPE 26536, pp. 1-11 (1993).

Sas-Jaworsky, A. and J.G. Williams, "Enabling capabilities and potential applications of composite coiled tubing", Proceedings of World Oil's 2nd International Conference on Coiled Tubing Technology, pp. 2-9 (1994).

Sas-Jaworsky II Alex.; "Developments Position CT for Future Prominence", The American Oil & Gas Reporter, pp. 87-92 (Mar. 1996).

Moe Wood T. et al.; "Spoolable, Composite Piping for Chemical and Water Injection and Hydraulic Valve Operation", Proceedings of the 11th International Conference on Offshore Mechanics and Arctic Engineering-I992-, vol. III, Part A—Materials Engineering, pp. 199-207 (1992).

Shuart J. M. et al.; "Compression Behavior of ≠45o-Dominated Laminates with a Circular Hole or Impact Damage", AIAA Journal 24(1):115-122 (Jan. 1986).

Silverman A. Seth; "Spoolable Composite Pipe for Offshore Applications", Materials Selection & Design pp. 48-50 (Jan. 1997).

Rispler K. et al.; "Composite Coiled Tubing in Harsh Completion/Workover Environments", Paper presented at the SPE GAS Technology Symposium and Exhibition held in Calgary, Alberta, Canada, on Mar. 15-18, 1998, pp. 405-410.

Williams G. J. et al.; "Composite Spoolable Pipe Development, Advancements, and Limitations", Paper presented at the 2000 Offshore Technology Conference held in Houston Texas from May 1-4, 2000, pp. 1-16.

Hartman, D.R., et al., "High Strength Glass Fibers," Owens Coming Technical Paper (Jul. 1996).

International Search Report mailed on Jan. 22, 2001.

International Search Report mailed on Mar. 5, 2001.

International Search Report mailed on Nov. 8, 2005.

Dalmolen "The Properties, Qualification, and System Design of, and Field Experiences with Reinforced Thermoplastic Pipe for Oil and Gas Applications" NACE International, 2003 West Conference (Feb. 2003).

(56) References Cited

OTHER PUBLICATIONS

Fiberspar Tech Notes, "Horizontal well deliquification just got easier-with Fiberspar Spoolable Production Systems," TN21-R1UN1-HybridLift, 2010, 2 pages.
International Search Report and Written Opinion for PCT/US2010/060582 mailed on Feb. 16, 2011, (11 pages).
Mesch, K.A., "Heat Stabilizers," Kirk-Othmer Encyclopedia of Chemical Technology, 2000 pp. 1-20.
Rispler et al. "Composite Coiled Tubing in Harsh Completion/Workover Environments" Paper presented at the SPE GAS Technology Symposium and Exhibition held in Calgary, Alberta, Canada on Mar. 15-18, 1998, pp. 405-410.

* cited by examiner

WEIGHTED SPOOLABLE PIPE

RELATED APPLICATIONS

This application claims priority to application U.S. Ser. No. 60/890,080 filed Feb. 15, 2007, hereby incorporated by reference in its entirety.

BACKGROUND

Steel pipe is commonly used in the oil and gas industry. This type of pipe may be used in the transport of fluids to or from the well such as oil and gas gathering lines, flow lines, and fluid and gas injection lines which may be installed on the surface or buried. Steel pipe may also be used for downhole applications such as drilling, intervention, or production including drill strings, coiled tubing, production tubing, casing, and velocity and heater strings, and the like. Steel pipelines, gathering lines or injection lines are usually installed using short (30-40 foot) sections. This requires additional labor and provides the possibility for fluid leakage at each fitting. Such labor intensive installation may also lead to lost revenues if production or transport of the fluids is suspended during the installation.

To resist internal corrosion, steel alloys, non-metallic internal coatings, or fiberglass-reinforced epoxy pipe may be used, but all may still have the disadvantage of being sectional products. In addition, the wall of a fiberglass-reinforced epoxy pipe may be fairly damage intolerant and may requires careful handling, installation, and/or use of specific back-fill materials. Damage or cracks in the fiberglass reinforced epoxy layer can in some cases lead to small leaks or "weeping" of the pipe under pressure. In some applications, thermoplastic liners may be used as corrosion protection inside steel pipe, but these liners are susceptible to collapse by permeating gases trapped in the annulus between the liner and the steel pipe if the pressure of the bore is rapidly decreased. Unreinforced thermoplastic pipe, on the other hand, can usually only tolerate relatively low pressures especially at temperature and in the presence of oilfield fluids.

Fiberglass reinforced epoxy tubes used in oil and gas applications may have positive buoyancy, and thus may float, move, or otherwise have instability when in muddy, sandy or flooded ground unless weighted down. While in some situations positive buoyancy may be desirable, positive buoyancy can affect the performance of the tube and can also lead to an increase in damage from movement of the pipe in ground. Problems associated with positive buoyancy may be particularly acute with tubes that are manufactured from low-density structural materials or have large volumes of bore relative to the volume and density of the structural material.

Therefore, there is a need for a weighted, low-cost, corrosion resistant, spoolable, reinforced inner-lined pipe for such relatively low pressure applications so that the tube remains negatively buoyant when in use.

SUMMARY

Disclosed is a reinforcing material that includes fibers and a solid hydrocarbon matrix. Such a reinforcing material may be used as a reinforcing layer, for example, in a spoolable pipe that may also include an inner layer and an outer layer. Also disclosed is a spoolable pipe comprising at solid hydrocarbon matrix or wax.

DETAILED DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

Disclosed herein is a spoolable tube that provides a path for conducting fluids (i.e., liquids and gases) along the length of the spoolable tube. For example, the spoolable tube can transmit fluids down a well hole for operations upon the interior surfaces of the well hole, the spoolable tube can transmit fluids or gases to hydraulic or pneumatic machines operably coupled to the spoolable tube, and/or the spoolable tube can be used to transmit fluids, underwater, underground, or on surface systems from well holes or other equipment to transmission, distribution pipelines or other equipment. Accordingly, the spoolable tube disclosed herein can provide a conduit for powering and controlling hydraulic and/or pneumatic machines, and/or act as a conduit for fluids, for example gases or liquids. In some embodiments, the spoolable tubes disclosed herein are used for relatively low pressure applications, where the pressure of a fluid being transported by a disclosed tube is about 1 to about 1000 psi, or about 10 to about 500 psi.

The articles "a" and "an" are used herein to refer to one or to more than one (i.e. to at least one) of the grammatical object of the article. By way of example, "an element" means one element or more than one element.

Figure 1:
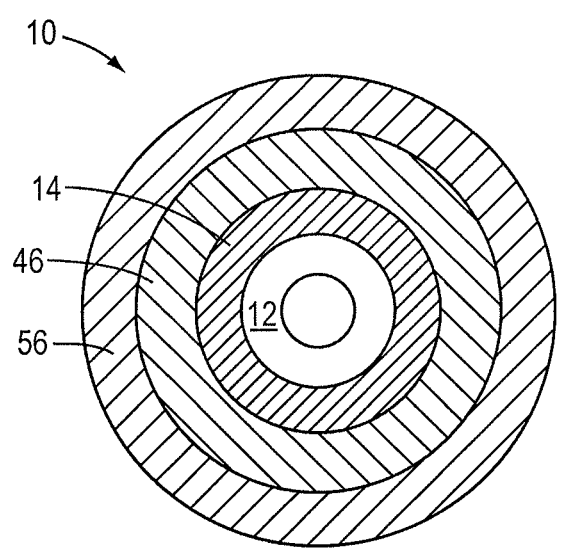
FIG. 1 is a cross-sectional view of a spoolable tube having an inner pressure barrier surrounded by reinforcing layers and a weight layer.

FIG. 1 illustrates a cross-section of a circular spoolable tube 10 constructed of an internal pressure barrier 12, a reinforcing layer 14, a weight layer 16, and an external layer 56. The spoolable tube can be generally formed along a longitudinal axis 17. Although illustrated in FIG. 1 as having a circular cross-section, the disclosed spoolable tube can have a variety of tubular cross-sectional shapes, including but not limited to circular, oval, rectangular, square, polygonal, and/or others.

The internal pressure barrier 12, otherwise referred to as a liner, can serve as a pressure containment member to resist leakage of internal fluids from within the spoolable tube 10. In some embodiments, the internal pressure barrier 12 can include a polymer, a thermoset plastic, a thermoplastic, an elastomer, a rubber, a co-polymer, and/or a composite. The composite can include a filled polymer and a nano-composite, a polymer/metallic composite, and/or a metal (e.g., steel, copper, and/or stainless steel). Accordingly, an internal pressure barrier 12 can include one or more of a polyethylene, a cross-linked polyethylene, a polyvinylidene fluoride, a polyamide, polyethylene terphthalate, polyphenylene sulfide and/or a polypropylene, or combinations of these materials, either as distinct layers or as blends, alloys, copolymers, block copolymers or the like. The internal pressure barrier may also contain solid state additives. In one embodiment, the internal pressure barrier 12 includes a modulus of elasticity greater than about approximately 50,000 psi, and/or a strength greater than about approximately 1,000 psi. In some embodiments, the internal pressure barrier 12 can carry at least fifteen percent of the axial load along the longitudinal axis, at least twenty-five percent of the axial load along the longitudinal axis, or at least thirty percent of the axial load along the longitudinal axis at a termination, while in some embodiments, the internal pressure barrier 12 can carry at least fifty percent of the axial load along the longitudinal axis at a termination. Axial load may be determined at the ends of a tube. For example, at the ends, or a termination, of a tube, there may be a tensile (e.g. axial) load equal to the internal pressure multiplied by the cross-sectional area of the inner diameter of the pipe.

Referring back to FIG. 1, the spoolable tube 10 can also include one or more reinforcing layers 14. In one embodiment, the reinforcing layers can include fibers having at least a partially helical orientation relative to the longitudinal axis of the spoolable tube. The fibers may have a helical orientation between substantially about thirty degrees and substantially about seventy degrees relative to the longitudinal axis 17. For example, the fibers may be counterwound with a helical orientation of about ±40°, ±45°, ±50°, ±55°, and/or ±60°. The reinforcing layer may include fibers having multiple, different orientations about the longitudinal axis. Accordingly, the fibers may increase the load carrying strength of the reinforcing layer(s) 14 and thus the overall load carrying strength of the spoolable tube 10. In another embodiment, the reinforcing layer may carry substantially no axial load carrying strength along the longitudinal axis at a termination.

The reinforcing layer(s) 14 can be formed of a number of plies of fibers, each ply including fibers. In one embodiment, the reinforcing layer(s) 14 can include two plies, which can optionally be counterwound unidirectional plies. The reinforcing layer can include two plies, which can optionally be wound in about equal but opposite helical directions. The reinforcing layer(s) 14 can include three, four, five, six, seven, eight, or more plies of fibers, each ply independently wound in a helical orientation relative to the longitudinal axis. Plies may have a different helical orientation with respect to another ply, or may have the same helical orientation. The reinforcing layer(s) 14 may include plies and/or fibers that have a partially and/or a substantially axial orientation. The reinforcing layer may include plies of fibers with a tape or coating, such as a tape or coating that includes abrasion resistant material or polymer, disposed between each ply, underneath the plies, on the outside of the plies, or optionally disposed between only certain plies. In some embodiments, an abrasion resistant layer is disposed between plies that have a different helical orientation.

The fibers can include structural fibers and/or flexible yarn components. The structural fibers can be formed of graphite, glass, carbon, KEVLAR, aramid, fiberglass, boron, polyester fibers, polyamide, ceramic, inorganic or organic polymer fibers, mineral based fibers such as basalt fibers, metal fibers, and wire. The flexible yarn components, or braiding fibers, graphite, glass, carbon, KEVLAR, aramid, fiberglass, boron, polyester fibers, polyamide, ceramic, inorganic or organic polymer fibers, mineral based fibers such as basalt fibers, metal fibers, and wire. For example, structural and/or flexible fibers can include glass fibers that comprise e-glass, e-cr glass, Advantex®, s-glass, d-glass, borosilicate glass, soda-lime glass or a corrosion resistant glass. The fibers included in the reinforcing layer(s) 14 can be woven, braided, knitted, stitched, circumferentially wound, helically wound, axially oriented, and/or other textile form to provide an orientation as provided herein (e.g., in the exemplary embodiment, with an orientation between substantially about thirty degrees and substantially about seventy degrees relative to the longitudinal axis 17). The fibers can be biaxially or triaxially braided.

Reinforcing layers contemplated herein may include fibers that are at least partially coated by a matrix, or may include fibers that are embedded within a matrix, or may include a combination. A reinforcing layer may comprise up to about 30% of matrix by volume, up to about 50% of matrix by volume, up to about 70% of matrix by volume, or even up to about 80% or higher by volume.

The matrix material may be a high elongation, high strength, impact resistant polymeric material such as epoxy. Other alternative matrixes include nylon-6, vinyl ester, polyester, polyetherketone, polyphenylen sulfide, polyethylene, polypropylene, thermoplastic urethanes, and hydrocarbons such as waxes or oils. For example, a reinforcing layer may also include a matrix material such as polyethylene, e.g. low density polyethylene, medium density polyethylene, linear low density polyethylene, high density polyethylene, polypropylene, cross-linked polyethylene, polybutylene, polybutadiene, or polyvinylchloride.

A reinforcing layer may further include pigments, plasticizers, flame retardants, water resistant materials, water absorbing materials, hydrocarbon resistant materials, hydrocarbon absorbent materials, permeation resistant materials, permeation facilitating materials, lubricants, fillers, compatibilizing agents, coupling agents such as silane coupling agents, surface modifiers, conductive materials, thermal insulators or other additives, or a combination of these.

In one embodiment, the reinforcing layer(s) 14 includes fibers having a modulus of elasticity of greater than about 5,000,000 psi, and/or a strength greater than about 100,000 psi. In some embodiments, an adhesive can be used to bond the reinforcing layer(s) 14 to internal pressure barrier 12. In other embodiments, one or more reinforcing layers are substantially not bonded to one or more of other layers, such as the inner liner, internal pressure barriers, or external layer(s).

Weight layer 46 may provide spoolable tube 10 with weight so that the pipe may become negatively buoyant. Weight layer 46 may comprise fibers wound over reinforcing layer 14. In one embodiment, a weight layer 46 can include fibers having at least a partially helical orientation relative to the longitudinal axis of the spoolable tube. Fibers for use in such a weighted layer may include glass, graphite, carbon, KEVLAR, aramid, fiberglass, boron, polyester fibers, polyamide, ceramic, inorganic or organic polymer fibers, mineral based fibers such as basalt fibers, metal fibers, and wire. Fibers for use in a weighted layer may include those fibers with a specific density greater than or about 2 g/cm$^3$.

Fibers for use in a weight layer 46 may be impregnated or coated with a fiber protecting substance to, e.g. prevent water from interacting with the fiber. Fibers present in weight layer 46 may also include materials that displace air that may be present in a weighted layer that includes fibers. For example, dry glass fibers used in such a weighted layer may have entrapped air that contribute to 40% of the volume of such a layer. Air displacing materials may include fiber coatings, polymers, water, and hydrocarbons such as oil or grease.

In some embodiments, one or more weight layers may be substantially free of the reinforcing layer, e.g. substantially free of a matrix which comprises at least part of a reinforcing layer. Alternatively, a weight layer may consist essentially of fibers.

Weight layer(s) 46 may also include a tape disposed over the fibers to, for example, to hold the weight layer fibers together, which may be useful e.g. during processing. Such a tape may be permeable to water or have perforations so that water may saturate the weighted layer. For example, a water saturated weight layer may have more weight than a dry layer.

The external layer(s) 56 can provide wear resistance, UV, and impact resistance or thermal insulation, or selectively increase or decrease the permeability. For example, the external layer 56 can provide abrasion resistance and wear resistance by forming an outer surface to the spoolable tube that has a low coefficient of friction thereby reducing the wear on the reinforcing layers from external abrasion. Further, the external layer 56 can provide a seamless layer, to, for example, hold the inner layers 12, 14 of the coiled spoolable tube 10 together. Alternatively, external layer 56 may be permeable to fluids such as gasses arising from fluids transported in the spoolable tube 10, for example, external layer can include a plurality of perforations. Such permeablity may facilitate the removal or escape of such gasses and thus prevent, e.g. bursting of the tube. Such permeability of external layer 56 may, in some embodiments, facilitate the incorporation of water in the weight layer 46.

The external layer 56 can be formed of a filled or unfilled polymeric layer. Alternatively, the external layer 56 can be formed of a fiber, such as aramid or glass, with or without a matrix. Accordingly, the external layer 56 can be a polymer, thermoset plastic, a thermoplastic, an elastomer, a rubber, a co-polymer, and/or a composite, where the composite includes a filled polymer and a nano-composite, a polymer/metallic composite, and/or a metal. In some embodiments, the external layer(s) 56 can include one or more of polyethylene, a cross-linked polyethylene, a polyvinylidene fluoride, a polyamide, polyethylene terphthalate, polyphenylene sulfide and/or a polypropylene. The external layer 56 can include a modulus of elasticity greater than about approximately 50,000 psi, and/or a strength greater than about approximately 1,000 psi. In an embodiment, the external layer 56 can carry at least ten percent, twenty percent, twenty-five percent, thirty percent or even at least fifty percent of an axial load in the longitudinal direction at a termination. A seamless external layer can comprise, for example, a perforated thermoplastic.

In some embodiments, the external layer 56 can be formed by extruding, while the layer 56 can be formed using one or more materials applied at least partially helically and/or at least partially axially along the longitudinal axis 17. The material can include, for example, one or more polymeric tapes. In an example embodiment, the external layer 56 can include and/or otherwise have a coefficient of friction less than a coefficient of friction of a reinforcing layer 14.

Particles can be added to the external layer 56 to increase the wear resistance of the external layer 56. The particles used can include one or more of ceramics, minerals, metallics, polymerics, silicas, or fluorinated polymers. For example, adding TEFLON (MP 1300) particles and an aramid powder (PD-T polymer) to the external layer 56 can reduce friction and enhance wear resistance. Particles, for example, $TiO_2$ or carbon black, may be added to increase UV resistance of the external layer.

It can be understood that pressure from fluids transported by the spoolable tubes 10 disclosed herein may not be properly released from the reinforcing layer(s) 14, and/or from the inner pressure barrier liner and/or from within the external layer, without, for example, an external layer having a sufficient permeability to provide such pressure release. Such accumulation of pressure can cause deterioration of the spoolable pipe 10, for example, external layer rupture or inner pressure barrier collapse when bore pressure is reduced. Accordingly, in some embodiments, to allow for pressure release along the length of the spoolable pipe 10, the external layer(s) 56 can include and/or have a permeability at least five, or at least ten times greater than the permeability of the internal pressure barrier 12, or the reinforcing layer 14. For example, external layer(s) 56 include perforations or holes spaced along the length of tube. Such perforations can, for example, be spaced apart about every 10 ft, about every 20 ft, about every 30 ft, and even about or greater than about every 40 ft. In one embodiment, the external layer 56 can be perforated to achieve a desired permeability, while additionally and optionally, an external layer 56 can include one or more polymeric tapes, and/or may be discontinuous.

Figure 2:
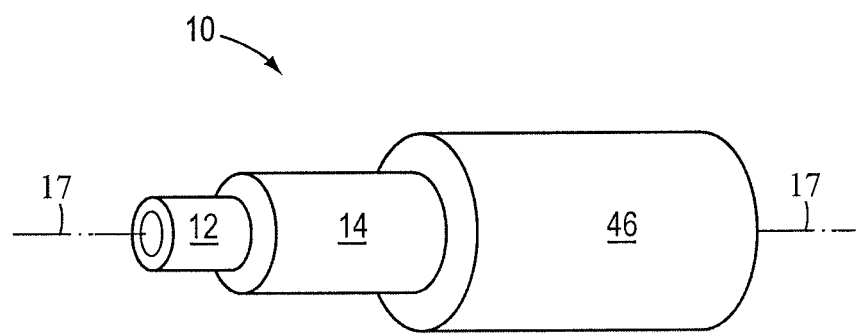
FIG. 2 is a side view, partially broken away, of a spoolable tube having an inner pressure barrier, a reinforcing layer, and a weight layer.

FIG. 2 illustrates a spoolable tube 10 elongated along an axis 17 and having an internal pressure barrier 12, a reinforcing layer 14, and at least one weight layer 46 enclosing at least partially the reinforcing layer(s) 14. Such a tube may also include an external layer(s) 56 (not shown) that may otherwise be understood to be an outer protective layer. In some embodiments, the external layer 56 is substantially unbonded to one or more of the reinforcing layer(s) 14, and/or substantially unbonded to the weight layer 46, or substantially unbonded to one or more plies of the weight layer(s) 46. The external layer 56 may be partially bonded to one or more other layers of the tube.

The disclosed spoolable tubes 10 can also include one or more couplings or fittings. For example, such couplings may engage with, be attached to, or in contact with one or more of the internal and external layers of a tube, and may act as a mechanical load transfer device. Couplings may engage one or both of the inner liner, the external wear layer or the reinforcing layer. Couplings or fittings may be comprised, for example, of metal or a polymer, or both with or without elastomeric seals such as O-rings. In some embodiments, such couplings may allow tubes to be coupled with other metal components. In addition, or alternatively, such couplings or fittings may provide a pressure seal or venting mechanism within or external to the tube. One or more couplings may each independently be in fluid communication with the inner layer and/or in fluid communication with one or more reinforcing layers and/or weight layer, and/or in fluid communication with an external layer. Such couplings may provide venting, to the atmosphere, of any gasses or fluids that may be present in any of the layers between the external layer and the inner layer, inclusive.

Figure 3:
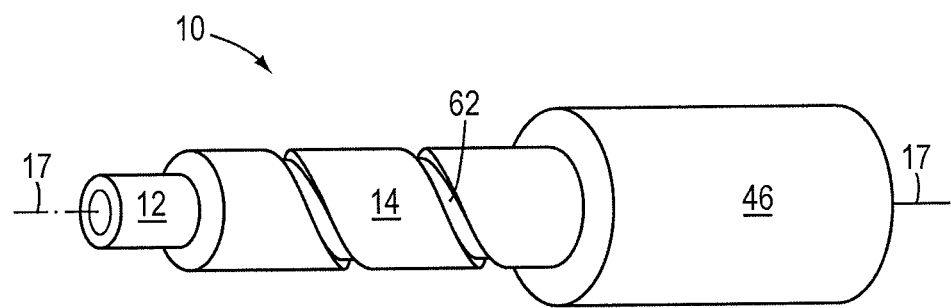
FIG. 3 is a side view, partially broken away, of a spoolable tube that includes an energy conductor.

With reference to FIG. 3, the disclosed spoolable tubes 10 can also include one or more energy conductors 62 that can be integral with the wall of the spoolable pipe. Accordingly, the energy conductors 62 can be integral with the internal pressure barrier, reinforcing layer(s), and/or exist between such internal pressure barrier 12 and reinforcing layer 14, and/or exist between the internal pressure barrier 12 and the weight layer 46, and/or exist between the reinforcing layer 14 and an external layer. In some embodiments, the energy conductor 62 can extend along the length of the spoolable tube 10. The energy conductors 62 can include an electrical guiding medium (e.g., electrical wiring), an optical and/or light guiding medium (e.g., fiber optic cable), a hydraulic power medium (e.g., a high pressure tube or a hydraulic hose), a data conductor, and/or a pneumatic medium (e.g., high pressure tubing or hose).

The disclosed energy conductors 62 can be oriented in at least a partially helical direction relative to a longitudinal 17 axis of the spoolable tube 10, and/or in an axial direction relative to the longitudinal axis 17 of the spoolable tube 10.

A hydraulic control line embodiment of the energy conductor 62 can be either formed of a metal, composite, and/or a polymeric material.

In one embodiment, several energy conductors 62 can power a machine operably coupled to the coiled spoolable tube 10. For instance, a spoolable tube 10 can include three electrical energy conductors that provide a primary line 62, a secondary line 62, and a tertiary line 62 for electrically powering a machine using a three-phase power system. As provided previously herein, the spoolable tube 10 can also include internal pressure barriers 12 for transmitting fluids along the length of the tube 10.

Although the methods, systems and tubes have been described relative to a specific embodiment(s) thereof, they are not so limited. Obviously many modifications and variations may become apparent in light of the above teachings. Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

All publications and patents mentioned herein, including those items listed below, are hereby incorporated by reference in their entirety as if each individual publication or patent was specifically and individually indicated to be incorporated by reference. In case of conflict, the present application, including any definitions herein, will control.

The composite tubes disclosed in U.S. Pat. Nos. 5,921,285; 6,016,845; 6,148,866; 6,286,558; 6,357,485; and 6,604,550.

What is claimed is:

1. A negatively buoyant pipe comprising:
    an inner layer;
    a reinforcing layer comprising a first set of fibers and a matrix material, wherein the first set of fibers comprise a glass;
    a weight layer adapted to be saturated with a liquid when submerged, the weight layer comprising a second set of fibers having a specific gravity of at least about 2.0 g/cm3, wherein said weight layer is substantially free of said matrix material, wherein said second set of fibers comprise substantially the same material as the first set of fibers, and wherein said second set of fibers further comprise an air displacing material selected from the group consisting of a polymer and a hydrocarbon; and
    a tape layer disposed between said weight layer and an external layer, each of said tape layer and said external layer comprising a plurality of perforations adapted to allow permeation of liquid to the weight layer,
    wherein said pipe is spoolable.

2. The pipe of claim 1, wherein substantially each fiber in said second set of fibers is axially and/or helically oriented.

3. The pipe of claim 1, wherein said tape layer is perforated.

4. The pipe of claim 1, wherein said tape layer is substantially permeable to water.

5. The pipe of claim 1, wherein said tape layer comprises a plurality of perforations.

6. The pipe of claim 1, wherein said second set of fibers are wound continuously and extend along a length of said pipe.

7. The pipe of claim 1, wherein said second set of fibers comprises at least one of: a glass, an aramid, a carbon, a ceramic, a metallic material, and a polymer.

8. The pipe of claim 7, wherein said second set of fibers comprises glass.

9. The pipe of claim 1, wherein said weight layer further comprises a grease or oil.

10. The pipe of claim 1, wherein said weight layer further comprises a hydrocarbon.

11. The pipe according to claim 1, where the inner layer includes at least one of: a thermoset plastic, a thermoplastic, an elastomer, a rubber, a co-polymer, and a composite, where the composite includes at least one of: a filled polymer and a nano-composite, a polymer/metallic composite, and a metal.

12. The pipe according to claim 1, where the inner layer comprises at least one of: polyethylene, high density polyethylene, cross-linked polyethylene, polyvinylidene fluoride, polyamide, polypropylene, polyethylene terphthalate, and polyphenylene sulfide.

13. The pipe according to claim 1, where the inner layer includes a modulus of elasticity greater than about 50,000 psi.

14. The pipe according to claim 1, where the internal pressure barrier includes a strength greater than about 1,000 psi.

15. The pipe according to claim 1, where the external layer includes at least one of: a thermoset plastic, a thermoplastic, an elastomer, a rubber, a co-polymer, and a composite, where the composite includes at least one of: a filled polymer and a nano-composite, a polymer/metallic composite, and a metal.

16. The spoolable pipe according to claim 1, where the external layer includes at least one of: polyethylene, high density polyethylene, cross-linked polyethylene, polyvinylidene fluoride, polyamide, polypropylene, polyethylene terphthalate, and polyphenylene sulfide.

17. The pipe of claim 1, wherein said matrix comprises a thermoset material.

18. The pipe of claim 17, wherein said thermoset material is an epoxy.

19. The pipe of claim 1, wherein said matrix comprises a thermoplastic.

20. The pipe of claim 19, wherein said thermoplastic is at least one of: polypropylene, polyethylene, polyetheretherketone, nylon, vinyl ester, polyester, polyphenylene sulfide, and thermoplastic urethane.

21. The pipe of claim 20, wherein said matrix comprises at least one of: polypropylene, polyethylene, polyetheretherketone, nylon, vinyl ester, polyester, polyphenylene sulfide, and thermoplastic urethane.

22. The pipe of claim 1, further comprising a sensor.

23. The pipe of claim 1, further comprising an energy conductor extending along a length of the composite tube.

* * * * *